4,205,833
Date: Jun. 3, 1980
Inventor: Lenz

United States Patent [19]
Lenz

[54] BENCH VISE

[75] Inventor: John O. Lenz, Coon Rapids, Minn.

[73] Assignee: Kurt Manufacturing Company, Inc., Minneapolis, Minn.

[21] Appl. No.: 956,029

[22] Filed: Oct. 30, 1978

[51] Int. Cl.² ............................................. B23Q 3/02
[52] U.S. Cl. ................................... 269/134; 269/247
[58] Field of Search ................. 269/97, 101, 134, 136, 269/137, 138, 139, 240, 250, 244, 247

[56] References Cited

U.S. PATENT DOCUMENTS

| | | | |
|---|---|---|---|
| 1,205,795 | 11/1916 | Sapper | 269/138 |
| 2,880,638 | 4/1959 | Muggli et al. | 269/130 |
| 3,397,880 | 8/1968 | Kuban | 269/134 |
| 4,043,547 | 8/1977 | Glomb | 269/136 |
| 4,098,500 | 7/1978 | Lenz | 269/136 |

Primary Examiner—Robert C. Watson
Attorney, Agent, or Firm—Kinney, Lange, Braddock, Westman and Fairbairn

[57] ABSTRACT

A bench vise which incorporates a self locking fixed jaw operating with a pair of interlocking surfaces reacting as the fixed jaw is loaded. As the workpiece is tightened down, the jaw tends to be forced downwardly against the sliding portion of the vise to tightly lock the workpiece being held. The reaction of the load is carried directly into the support shaft for the fixed jaw, which also forms a swivel member for the vise.

6 Claims, 3 Drawing Figures

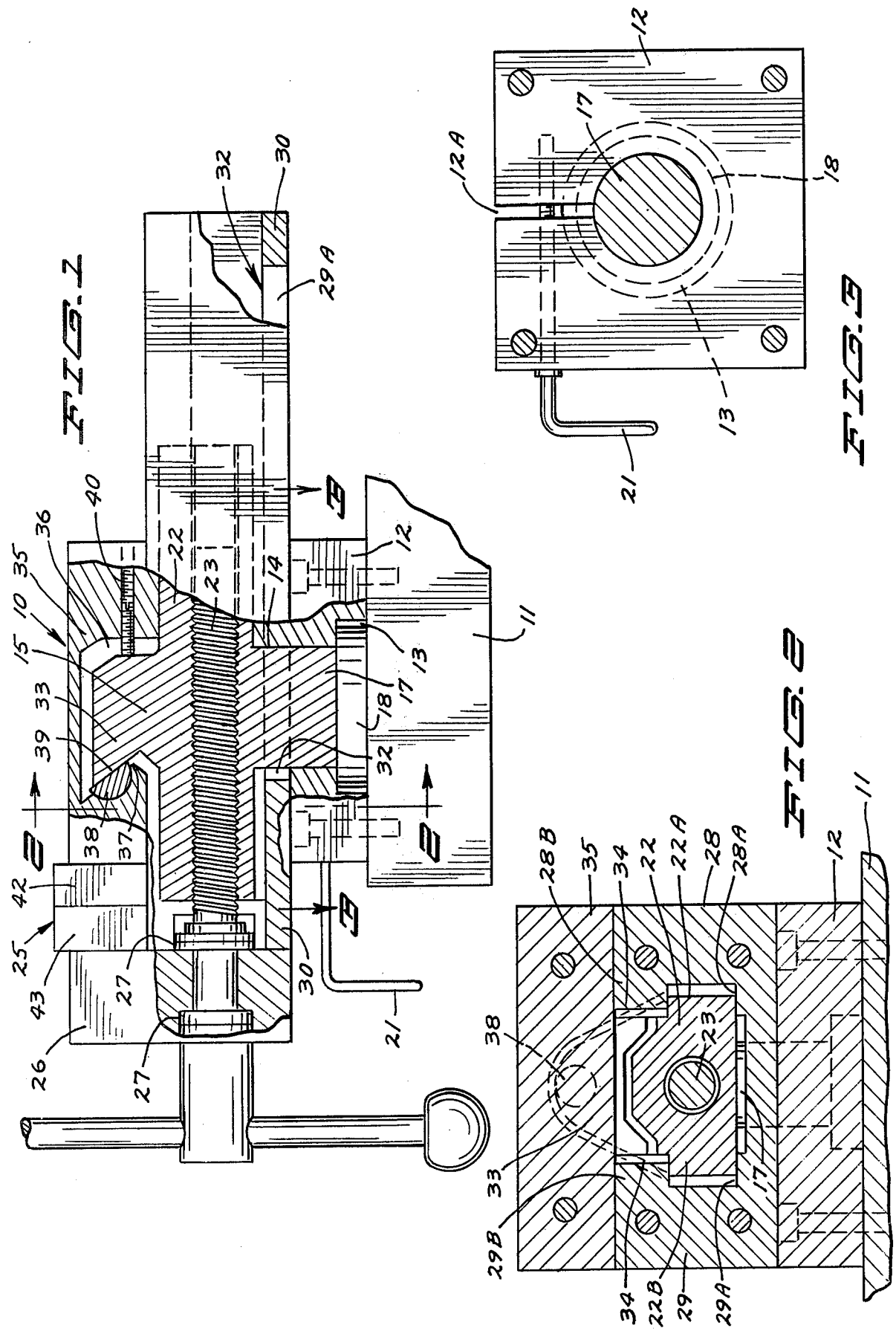

BENCH VISE

BACKGROUND OF THE INVENTION

1. Field of the Invention

The present invention relates to bench vises and more particularly to bench vises which include a clamping action fixed jaw.

2. Prior Art

In the prior art various bench vises have been advanced through the years which are provided with a fixed jaw that is mounted onto a support to permit swiveling of the vise relative to its support. Also vises which utilize a movable jaw having a clamping feature to provide for very rigid holding ability, and which permits the jaw to self align during operation are known. Examples of patents which show the type of device which have the self aligning, clamping jaw include U.S. Pat. Nos. 2,880,638 and 3,397,880.

SUMMARY OF THE INVENTION

The present invention relates to a bench vise which has a self aligning, clamping fixed jaw which includes a stub support shaft that permits the fixed jaw to be mounted onto a swivel connection collar and is held on a bench. The fixed jaw provides a guide when mounted in place on the swivel collar, which slidably guides a frame for the movable jaw to be mounted. A screw then is threaded through the fixed jaw and used for moving the movable jaw frame toward and away from the fixed jaw.

The fixed jaw includes a self aligning and clamping jaw plate mounted to a main mounting member. A movable body or frame carrying the movable jaw is adjustably mounted on the main mounting member. When clamping a workpiece and while moving the movable jaw the fixed jaw plate slides along the frame for the movable jaw and will self align on the workpiece. The fixed (self aligning) jaw plate clamps downwardly to tightly hold the workpiece onto the movable frame of the vise. The locking action is of advantage in bench type operations to securely hold workpieces, and permit self alignment of one jaw to insure satisfactory clamping.

BRIEF DESCRIPTION OF THE DRAWINGS

FIG. 1 is a vertical sectional view through the center portions of a bench vise made according to the present invention;

FIG. 2 is a sectional view taken as on line 2—2 in FIG. 2; and

FIG. 3 is a sectional view taken as on line 3—3 in FIG. 1.

DESCRIPTION OF THE PREFERRED EMBODIMENT

A bench vise illustrated generally at 10 is mounted onto a shop bench 11. A collar 12 is mounted onto the bench with suitable screws or other fastening means. The collar is a split type collar that has an inner recess 13 on its lower side, above the top of the bench 11. The collar has a center opening 14 which opens upwardly from the recess. The opening 14 receives a stub shaft 17 of a fixed bench vise jaw support indicated generally at 15. The shaft 17 is cylindrical and fixed to the lower side of the support. The shaft 17 passes through the opening 14, and held on the collar by a nut 18 that is threaded onto the lower end of the shaft 17. The nut 18 fits within the receptacle 13.

A suitable clamping lever 21 that extends across the split 12A in the collar 12 is used to clamp and release the shaft 17. The lever 21 tightens down the split 12A to securely hold the shaft 17 in any desired rotational position. By loosening the lever 21, the shaft and fixed jaw support 15 can be rotated.

The support 15 has an elongated body portion 22 fixed to the shaft 17, and this body portion has an interior opening that is threaded to receive a suitable vise screw 23. This screw 23 thus threads through the fixed jaw body 22, and a movable jaw body assembly indicated generally at 25 is connected to the screw at the outer end of the screw. The jaw body assembly 25 includes an end plate 26 through which the screw 23 passes, and suitable thrust washers 27 can be provided on opposite sides of the surfaces of the end plate 26 so that as the screw is threaded the end plate will be forced in longitudinal direction with the screw as it moves through the fixed support 15.

The movable jaw frame (FIG. 2) includes channel shaped side members 28 and 29. The side members are fastened together with cross pieces 30 at the remote end of the frame and adjacent the cross plate 26 to hold the side members 28 and 29 in position. These members 28 and 29 have lower inwardly directed legs 28A and 29A, respectively, which are positioned above the collar 12 and below side guide portions 22A and 22B of the main body 22 of the fixed jaw support 15. Side members 28 and 29 also have upper inwardly turned legs 28B and 29B, respectively, which fit above the guide portions 22A and 22B and are slidably guided on the tracks or guideways of the body 22. The legs 28A and 29A are spaced apart to form a slot 32 through which the shaft 17 extends, and the upper legs 28B and 29B of the guide members are spaced apart to permit an upper fixed jaw support portion 33 to extend through the slot 34 defined by these legs.

Therefore as the screw 23 is threaded relative to the fixed body 22, it will carry the movable jaw frame 25 along with it in longitudinal directions. The jaw frame is guided on the body 22 of the fixed jaw assembly. The elongated length of the fixed body 22 not only provides a long thread length for ease of threading, but also provides a substantial length of guide surface for the movable jaw frame.

The fixed jaw support portion 33 of the fixed body 22 has a forwardly inclined surface 39, and a jaw plate carrier 35 for the fixed jaw has a receptacle 36 therein which fits over this upper end portion 33. The jaw plate carrier 35 has an upwardly and rearwardly directed inclined face 37 that mates with the surface 39. A part spherical bearing member 38 has a surface which is slidably engaged with the surface 39, and is positioned on a seat or receptacle provided in the face 37. The part spherical member 38 serves the same purpose as the same member shown in the prior art U.S. Pat. Nos. 2,880,638 and 3,397,880 in that it provides for universal compression carrying connection between the fixed jaw body, including upright member 33 and the jaw plate carrier 35 which is permitted limited movement relative to the fixed jaw support portion 33 when the fixed jaw plate carrier is not under load. To retain the jaw plate carrier 35 in place, a set screw 40 is threaded through the rear wall of the jaw plate carrier and is positioned to engage the upright rear wall of the support portion 33. The set screw 40 provides a loose connection that permits the jaw plate carrier 35 to move slightly for alignment, but it prevents the carrier 35 from coming off during use.

The undersurface of the jaw plate carrier 35 thus rests upon the upper surfaces of the inwardly turned legs 28B and 29B of the movable body, and as the workpiece is clamped between the fixed jaw plate 42 attached to fixed jaw plate carrier 35 and the movable jaw plate 43, the fixed jaw plate 42 and carrier 35 will be able to self align around the spherical seat 38. The movable jaw frame slides along the carrier 35 until the jaws clamp a workpiece. Thus the jaw plate 42 will tend to correct for misalignment that might be present when a workpiece is clamped. When a workpiece is clamped the fixed jaw plate 42 and carrier 35 will be forced downwardly onto the workpiece and toward the movable jaw frame by the inclined surfaces 39 and the mating surface of member 38, and tend to lock the movable jaw frame in position. This locking action is in addition to the normal friction of the threads of the screw 23. The workpiece thus can be worked on in place in the bench vise without loosening.

When the vise is to be swiveled about an upright axis, the clamp bolt 21 merely has to be loosened to permit the split collar assembly to loosen the shaft 17 and permit the unit to be rotated about the collar 12.

This type of bench vise therefore incorporates the advantages of an aligning, clamping jaw member, together with the swiveling action to permit use on a bench.

What is claimed is:

1. A bench vise comprising a movable jaw frame having elongated spaced apart side frame members and a movable jaw member mounted to extend between said side frame members at one end thereof, a fixed jaw assembly positioned between the side frame members including means to guide the side frame members for reciprocal movement relative to said fixed jaw assembly, said fixed jaw assembly including a fixed jaw support and a fixed jaw plate carrier mounted on said fixed jaw support for limited movement when the fixed jaw plate carrier is not under load, said fixed jaw plate carrier being aligned with said movable jaw member to permit clamping workpieces, a shaft member fixedly mounted on said fixed jaw support and extending between said side frame members, and housing means for rotatably mounting said shaft member at an end thereof opposite from the fixed jaw support and on an outer side of the side frame members, said housing means for rotatably mounting said shaft being adapted to be fixedly attached to a bench, cooperating means between said fixed jaw support and said fixed jaw plate carrier to react to said fixed jaw support clamping loads exerted by said movable jaw member on said fixed jaw plate carrier, comprising a pair of inclined surfaces oriented relative to the axis of movement of said movable jaw frame to urge the fixed jaw plate carrier toward the movable jaw frame under compressive clamping loads.

2. The combination as specified in claim 1 wherein one of said inclined surfaces comprises a surface of a member that permits movement of the fixed jaw plate carrier to self align relative to the movable jaw member.

3. The combination as specified in claim 2 wherein said movable jaw member is movably actuated relative to said fixed jaw support, and means on said fixed jaw support to slidably guide the movable jaw frame.

4. The combination as specified in claim 3 and a screw threadably mounted relative to said fixed jaw support and rotatably mounted relative to said movable jaw frame, said screw upon rotation being oriented to force said movable jaw member toward said fixed jaw plate carrier.

5. The combination of claim 4 wherein said fixed jaw support includes a body portion elongated in direction parallel to the axis of said screw to provide elongated support surfaces for said movable jaw frame.

6. A bench vise comprising a movable jaw member including a movable jaw frame, a fixed jaw assembly adapted to be mounted on a bench including means to guide said movable jaw frame for reciprocal movement relative to said fixed jaw assembly, said fixed jaw assembly including a fixed jaw support and a fixed jaw plate carrier mounted on said fixed jaw support for limited movement when the fixed jaw plate carrier is not under load, said fixed jaw plate carrier being aligned with said movable jaw member to permit clamping workpieces, cooperating means between said fixed jaw support and said fixed jaw carrier to react to said fixed jaw support clamping loads exerted by said movable jaw member on said fixed jaw plate carrier, comprising a pair of inclined surfaces oriented relative to the axis of movement of said movable jaw frame to urge the fixed jaw plate carrier toward the movable jaw frame under compressive clamping loads, said fixed jaw plate carrier slidably resting upon the movable jaw frame and being forced against said movable jaw frame under clamping loads on a workpiece held in said vise.

* * * * *